(12) United States Patent
Tseng et al.

(10) Patent No.: US 10,393,246 B2
(45) Date of Patent: Aug. 27, 2019

(54) ORIGINAL SHIFT SYSTEM (O.S.S.)

(71) Applicants: Huan Hsiung Tseng, Walnut, CA (US);
Kuo-Hung Tseng, Walnut, CA (US)

(72) Inventors: Huan Hsiung Tseng, Walnut, CA (US);
Kuo-Hung Tseng, Walnut, CA (US)

( * ) Notice: Subject to any disclaimer, the term of this patent is extended or adjusted under 35 U.S.C. 154(b) by 477 days.

(21) Appl. No.: 15/333,501

(22) Filed: Oct. 25, 2016

(65) Prior Publication Data
US 2017/0037948 A1   Feb. 9, 2017

Related U.S. Application Data

(63) Continuation-in-part of application No. 14/859,302, filed on Sep. 20, 2015, now abandoned.

(51) Int. Cl.
| | |
|---|---|
| *F16H 29/08* | (2006.01) |
| *F16H 37/16* | (2006.01) |
| *F16C 3/28* | (2006.01) |
| *F16H 29/20* | (2006.01) |
| *F16H 19/04* | (2006.01) |
| *F16H 29/04* | (2006.01) |
| *F16H 37/12* | (2006.01) |

(52) U.S. Cl.
CPC .............. *F16H 37/16* (2013.01); *F16C 3/28* (2013.01); *F16H 19/043* (2013.01); *F16H 29/04* (2013.01); *F16H 29/08* (2013.01); *F16H 29/20* (2013.01); *F16H 37/124* (2013.01)

(58) Field of Classification Search
CPC ........ F16H 29/08; F16H 29/20; F16H 19/043; F16H 37/124; Y10T 403/32024; Y10T 74/2179; Y10T 74/2181; F16C 3/28
USPC ..................................... 74/131, 600, 602, 76
See application file for complete search history.

(56) References Cited

U.S. PATENT DOCUMENTS 4,557,161 A * 12/1985 DeSousa ................. F16H 29/20
74/121
6,595,084 B2 * 7/2003 Park ........................ F16H 29/08
74/55

* cited by examiner

*Primary Examiner* — Jake Cook
*Assistant Examiner* — Randell J Krug
(74) *Attorney, Agent, or Firm* — Che-Yang Chen; Law Offices of Scott Warmuth

(57) ABSTRACT

A shift system related to an improved continuously variable transmission (CVT) may include a power output assembly, a power input assembly, a collar assembly, and a connecting assembly to connect the power output assembly and power input assembly. The shift system is advantageous because it employs only gears and hydraulics for the transmission of power, which can be used in any torque scenario, from low-torque to heavy-duty scenarios such as large passenger automobiles, large trucks and heavy-duty machinery. Furthermore, there is no need to use additional energy to keep the transmission "tight enough" to engage and to prevent any "slipping," and the overall efficiency of power transmission would be increased.

4 Claims, 11 Drawing Sheets

ORIGINAL SHIFT SYSTEM (O.S.S.)

CROSS-REFERENCE TO RELATED APPLICATION

The present invention is a continuation-in-part (CIP) application of Ser. No. 14/859,302 filed on Sep. 20, 2015 now pending, which is incorporated herein by reference.

FIELD OF THE INVENTION

The present invention relates to a shift system for vehicles, and more particularly to a shift system related to an improved continuously variable transmission (CVT) with a simple structure, which is more durable and can be used to generate higher torque than conventional CVTs.

BACKGROUND OF THE INVENTION

Generally speaking, automatic transmissions are essentially modulating converters that stepwise or steplessly independently change the present transmission ratio as a function of current or expected operating conditions, such as partial load, thrust, and ambient parameters such as temperature, air pressure, and humidity. Included in that group are modulating converters that are based on electric, pneumatic, hydrodynamic, or hydrostatic principles, or a combination of those principles.

A continuously variable transmission (CVT) normally includes a first shaft which can receive torque from a prime mover, a second shaft which is or can be parallel with the first shaft, an adjustable pulley or sheave on each of the two shafts, and an endless flexible element (such as a chain or a belt and hereinafter referred to as chain) trained over the two pulleys to transmit torque from the first shaft to the second shaft when the first shaft is driven by the prime mover. The two pulleys are adjustable and, to this end, each pulley comprises a first conical flange, which is affixed to the respective shaft, and a second conical flange which is rotatable with the first flange and is movable axially relative to the respective shaft toward and away from the respective first flange. Such adjustability of the pulleys enables the chain to move one of its looped portions radially inwardly toward one of the shafts while its other looped portion moves radially outwardly and away from the other shaft, or vice versa.

Continuously variable transmissions (CVTs) are often preferred over automatic transmissions, which employ a hydrokinetic torque converter in combination with a so-called bypass or lockup clutch. The reason is that the continuously variable transmission provides a greater comfort to the occupant or occupants of the motor vehicle because the shifts into different gear ratios invariably take place gradually without any appreciable shocks. Moreover, the utilization of a continuously variable transmission in the power train entails substantial savings in fuel requirements of the motor vehicle.

However, due to the physical limitations of continuously variable transmissions using the "cone-pulley" concept or a belt/chain driven system, conventional CVTs can only be used for low torque scenarios, such as small passenger vehicles and light duty machinery. Furthermore, the cones or belt/chains of a CVT must be kept tight in order to supply enough friction to be able to successfully transfer power and to prevent "slipping." This energy that is used to keep the cones and belt/chains tight is effectively another form of wasting energy and thus reducing overall efficiency.

Moreover, in conventional CVTs, there is a "lag" time from when the gas pedal is depressed to when the car accelerates, which is also due to the physical limitations of the conventional CVT system of cone-pulley or belt/chains resulting in slower acceleration and insufficient torque. Also, conventional CVTs have the issues of noise, vibration and harshness. And since the structure of conventional CVTs is complicated, the reliability and durability thereof are decreased. Therefore, there remains a need for an improved shift system to overcome the problems stated above.

SUMMARY OF THE INVENTION

It is an object of the present invention to provide a shift system related to an improved continuously variable transmission (CVT) that employs only gears and hydraulics for the transmission of power, which can be used in any torque scenario, from low-torque to heavy-duty scenarios such as large passenger automobiles, large trucks and heavy-duty machinery.

It is another object of the present invention to provide a shift system related to an improved CVT that employs only gears and hydraulics for the transmission of power, so there is no need to use additional energy to keep the transmission "tight enough" to engage and to prevent any "slipping," and the overall efficiency of power transmission would be increased.

It is still another object of the present invention to provide a shift system related to an improved CVT that employs only gears and hydraulics for the transmission of power, so the transmission of the power is instant and does not suffer from the "lag" in acceleration to improve the control, efficiency and safety of the transmission system.

It is still another object of the present invention to provide a shift system related to an improved CVT that employs only gears and hydraulics for the transmission of power, to eliminate the issues of noise, vibration and harshness associated with acceleration in conventional CVTs.

It is a further object of the present invention to provide a shift system related to an improved CVT with a rather simple structure to be more reliable and durable, and the manufacturing costs can be significantly reduced.

It is still a further object of the present invention to provide a shift system related to an environmental friendly CVT that can be set in the most suitable and efficient gear ratio, regardless of speed and condition, to reduce energy consumption.

It is still a further object of the present invention to provide a shift system related to an improved CVT that employs only gears and hydraulics for the transmission of power that can be used for situations such as auto racing or mountain climbing because of its capability of instantaneous and quite acceleration.

Various embodiments are illustrated in the figures and description provided herein. It should be understood, however, that the subject invention is not limited to the specific embodiments illustrated in the figures and specifically described herein.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", an, and the includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of in includes in and on unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
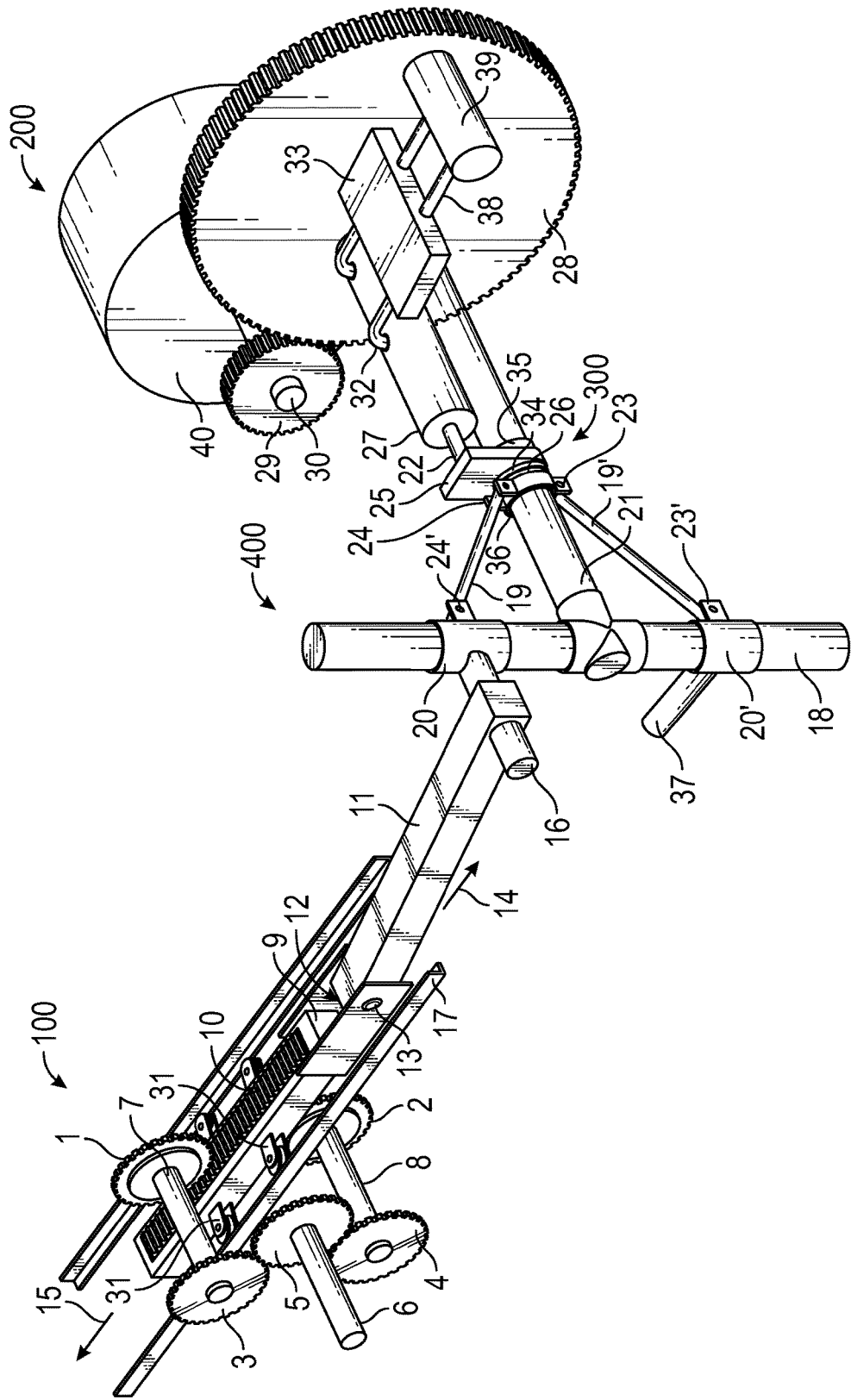
FIG. 1 is a schematic view of the shift system related to the improved continuously variable transmission (CVT) in the present invention.
Figure 2:
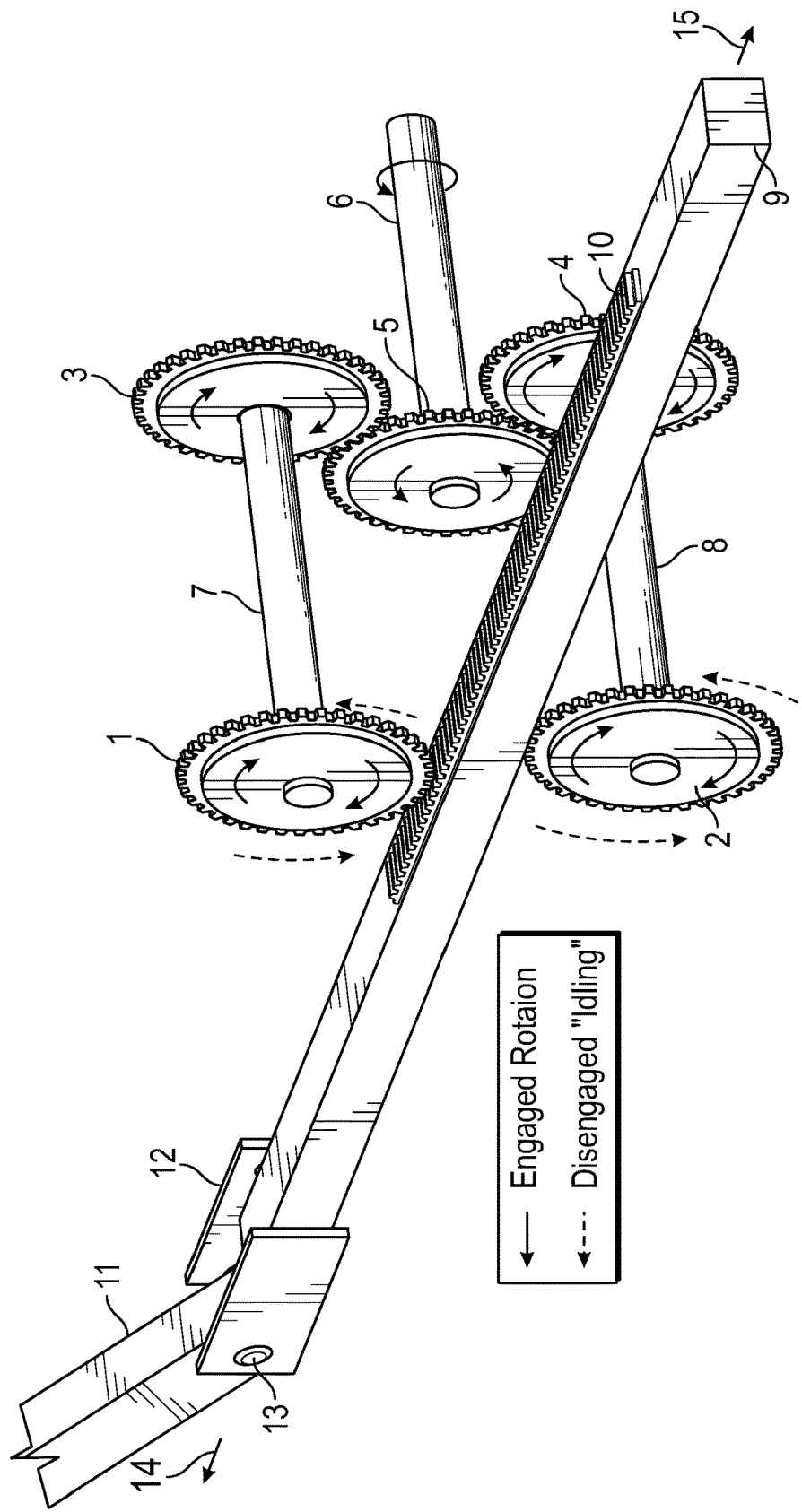
FIG. 2 is schematic view of the power output assembly in the present invention.
Figure 3:
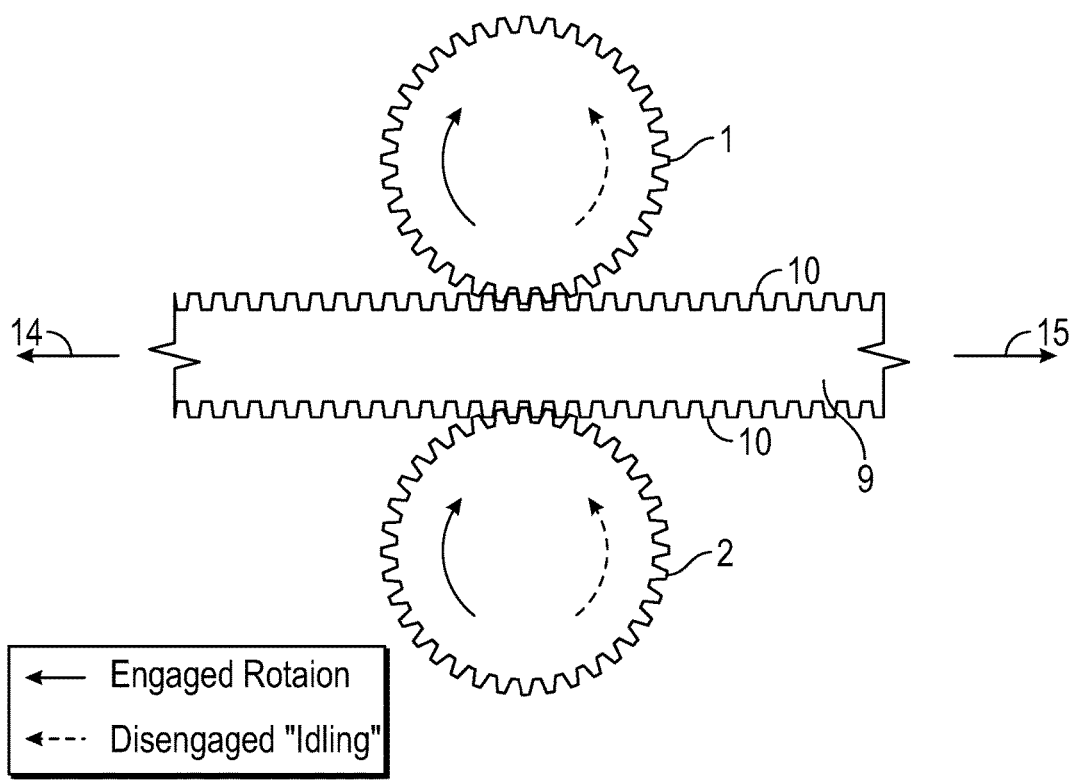
FIG. 3 is a schematic view of the main rod and freewheels of the power output assembly in the present invention.

In one aspect, as shown in FIGS. 1 to 3, a shift system may include a power output assembly 100, a power input assembly 200, a collar assembly 300, and a connecting assembly 400 to connect the power output assembly 100 and power input assembly 200. In one embodiment, the shift system relates to a continuously variable transmission (CVT). The power output assembly 100 may include a first freewheel 1 coupled with a first gear 3 through a first shaft 7 and a second freewheel 2 coupled with a second gear 4 through a second shaft 8. In one embodiment, the first freewheel 1 can be engaged with a main rod rack 10 on a top portion of a main rod 9, while the second freewheel 2 can be engaged with the main rod 10 on a bottom portion of the main rod 9.

The main rod 9 is pivotally connected with a connecting rod 11 through a pivoting hinge 13 to form a pivoting mechanism 12, so when power is generated by the power input assembly 200, the power can be used to drive the connecting rod 11 through the connecting assembly 400. In one embodiment, the main rod 9 moves toward a direction 15 as shown in FIGS. 1 to 3, and the main rod 10 engages with the first freewheel 1 and second freewheel 2 in a "rack and pinion" manner. Meanwhile, the second freewheel 2 rotates in a clock-wise manner as well as the second gear 4 through the second shaft 8, and second gear 4 is configured to engage with at least one output gear 5 with an output shaft 6 to drive the output gear 5 to rotate in a counter clock-wise manner. The output gear 5 also engages with the first gear 3 to drive the first gear 3 to rotate in a clock-wise manner as well as the first freewheel 1, however, when the main rod 9 moves toward direction 15, the first freewheel 1 is supposed to rotate in the counter clock-wise manner. Since two different momentums to rotate in different directions apply to freewheel 1 simultaneously, freewheel 1 may become idle. It is noted that the main rod 9 is configured to slide with a plurality of sliding wheels 31 along a rail 17 on each sides of the main rod 9.

In another embodiment, the main rod 9 moves toward a direction 14 as shown in FIGS. 1 to 3, and the main rod 10 engages with the first freewheel 1 and second freewheel 2 in a "rack and pinion" manner. At the present stage, the first freewheel 1 rotates in a clock-wise manner as well as the first gear 3 through the first shaft 7, and first gear 3 is configured to engage with at least one output gear 5 with an output shaft 6 to drive the output gear 5 to rotate in a counter clock-wise manner. The input gear 5 also engages with the second gear 4 to drive the second gear 4 to rotate in a clock-wise manner as well as the second freewheel 2, however, when the main rod 9 moves toward direction 14, the second freewheel 2 is supposed to rotate in the counter clock-wise manner. Since two different momentums to rotate in different directions apply to freewheel 2 simultaneously, freewheel 2 may become idle.

Figure 4:
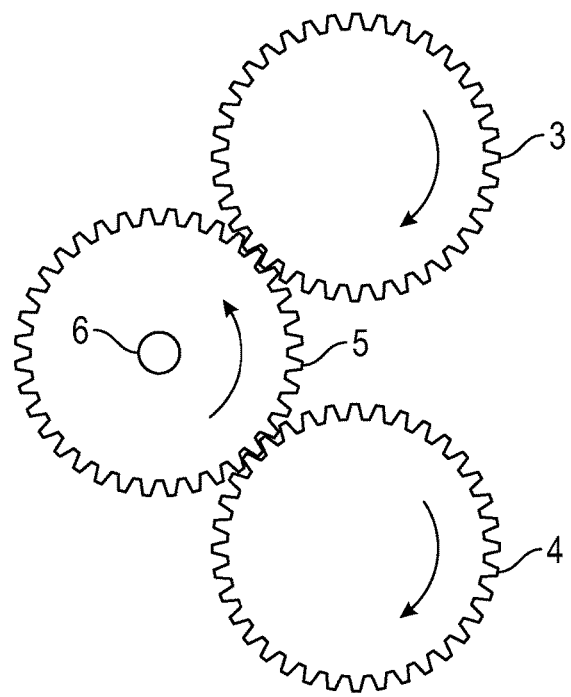
FIG. 4 is a schematic view of the first and second gears and output gear of the power output assembly in the present invention.

It is noted that regardless of the traveling direction of the main rod 9, the first gear 3 and second gear 4 always rotate in a clock-wise manner, and the output gear 5 always rotates in a counter clock-wise manner as shown in FIG. 4. The power can then be transferred out through the output shaft 6 in a counter clock-wise manner as well.

Still referring to FIG. 1, the power input assembly 200 may include an input gear 29, an input shaft 30 and a power source 40. In one embodiment, the input gear 29 engages with a reduction gear 28. One end of a main rotating shaft 21 is inserted to the center of the reduction gear 28, and the other end thereof is connected with a rotating arm 18, so when the rotating arm 18 can be driven by the reduction gear 28 through the main rotating shaft 21.

Figure 5:
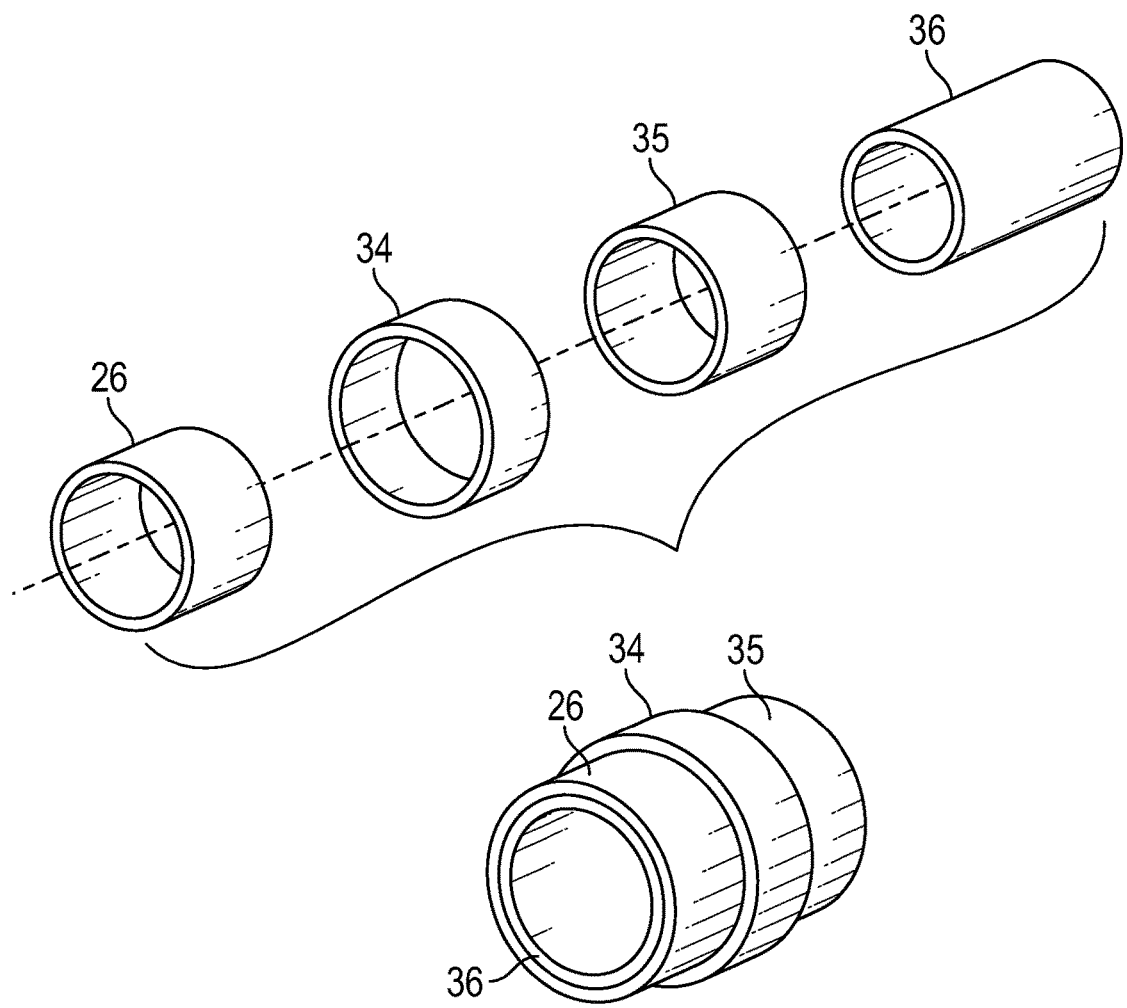
FIG. 5 is a schematic view of the collar assembly in the present invention.

The power input assembly 200 may further include a hydraulic cylinder 27 coupled with a hydraulic positioning rod 22, and the movement of the hydraulic cylinder 27 is managed by a control unit 33, and the positioning rod 22 is connected to an end plate 25. As shown in FIG. 5, the power input assembly 200 may have a collar assembly 300, which may include a front collar 26, a middle collar 34, a back collar 35 and a sliding collar 36. The sliding collar 36 is configured to slide and rotate on the main rotating shaft 21, and the front collar 26 and back collar 35 are both coupled with the sliding collar 36, so the three collars (26, 35, 36) can rotate as one unit on the main rotating shaft 21. It is noted that the middle collar 34 is a non-rotating collar and is sandwiched by the front collar 26 and back collar 35, and the middle collar 34 can also slide on the main rotating shaft 21. The sliding collar 36 is configured to slide reciprocally on the main rotating shaft 21 because of the middle collar 34 connected to the end plate 25 that is moved by the hydraulic cylinder 27.

The power input assembly 200 may also include a first stretcher 19 is connected to an upper flange 24' (on a sliding sleeve 20) on one end and to an upper portion 24 of the sliding collar 36 on the other end; while a second stretcher 19' is connected to a bottom flange 23' (on a sliding sleeve 20') on one end and to a lower portion 23 of the sliding collar 36 on the other end. In one embodiment, the stretchers (19, 19') are arranged in a V-shaped configuration as shown in FIG. 1. In another embodiment, the power input assembly 200 may include a pump 39 to provide oil to the hydraulic cylinder 27 and the control unit 33 through hydraulic oil pipes 32 and 38.

Figure 6:
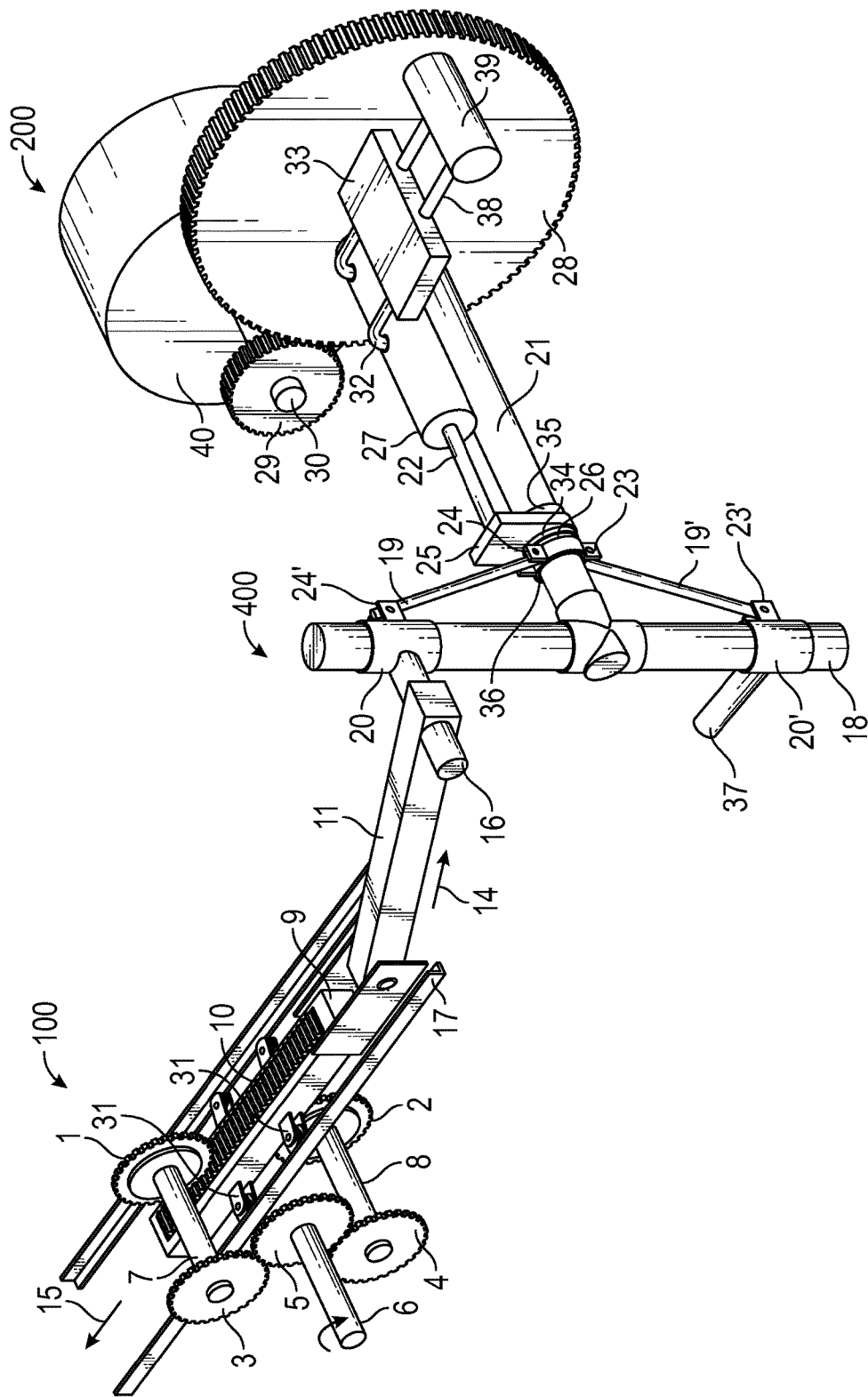
FIG. 6 is a schematic view of the power input assembly when the stretchers open up on the rotating arm to achieve the goal of high speed and low torque in the present invention.

In an exemplary embodiment, when the hydraulic cylinder 27 moves towards the rotating arm 18, it pushes the end plate 25 through the hydraulic positioning rod 22, and further pushes the sliding collar 36 towards the rotating arm 18. Meanwhile, since the stretchers (19, 19') are pivotally connected to the upper and lower portion (24, 23) of the sliding collar 36 as well as the upper and lower portions of the flanges (24', 23'), the sliding sleeves 20 and 20' are then driven to move up and down respectively on the rotating arm 18 as shown in FIG. 6. At the present stage, the distance between the stretchers (19, 19') on the rotating arm 18 increases, which is similar to an "up-shift" in a vehicle transmission having a higher speed but lower torque.

Figure 7:
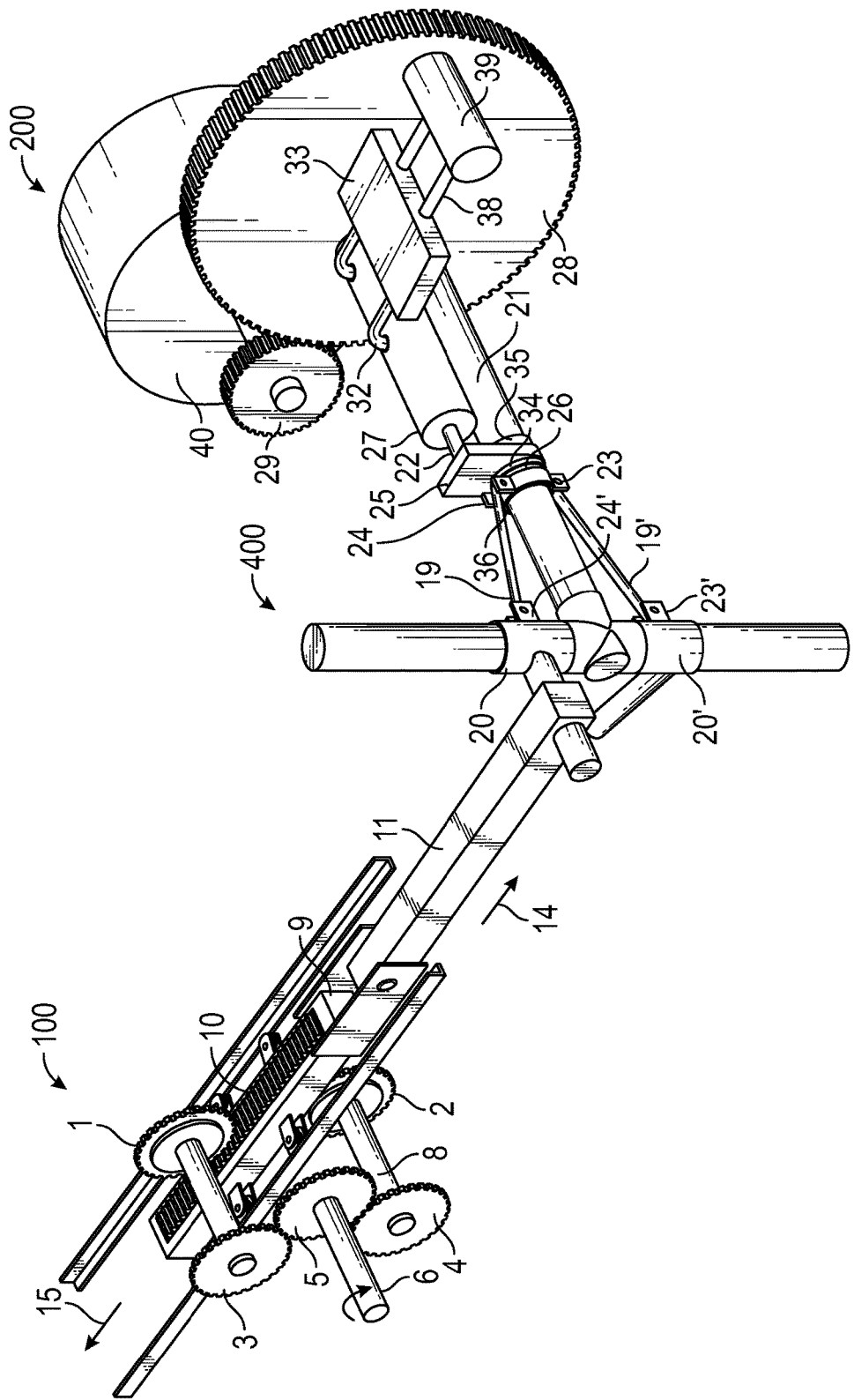
FIG. 7 is a schematic view of power input assembly when the stretchers move toward each other on the rotating arm achieve the goal of high torque and low speed in the present invention.

On the other hand, when the hydraulic cylinder 27 retracts to pull back the end plate 25 away from the rotating arm 18, the sliding collar 36 is also pulled back away from the rotating arm 18 to further drive the stretchers 19 and 19' to move closes to each other on the rotating arm 18 as shown in FIG. 7. At the present stage, the distance between the stretchers (19, 19') on the rotating arm 18 decreases, which is similar to a "down-shift" in a vehicle transmission having a lower speed but higher torque.

Figure 8:
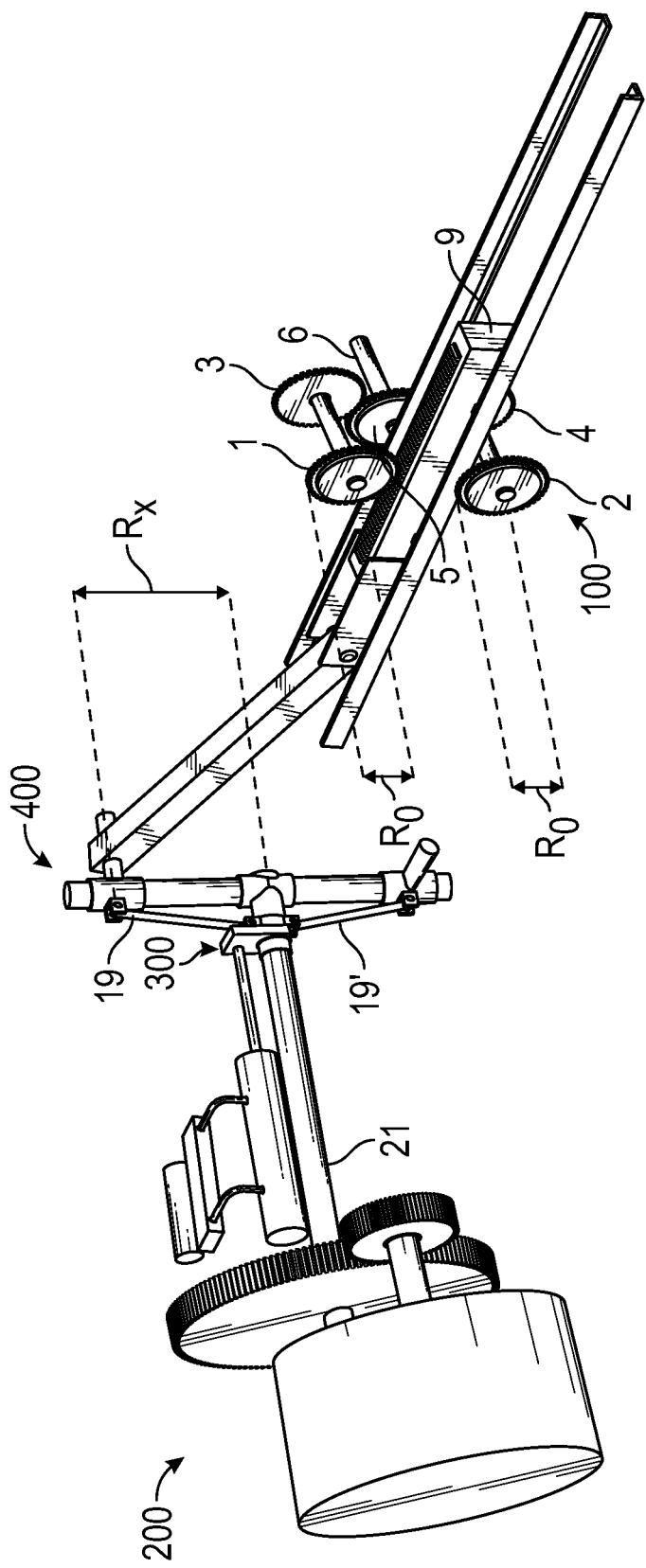
FIG. 8 illustrates the parameter R in the present invention.
Figure 9:
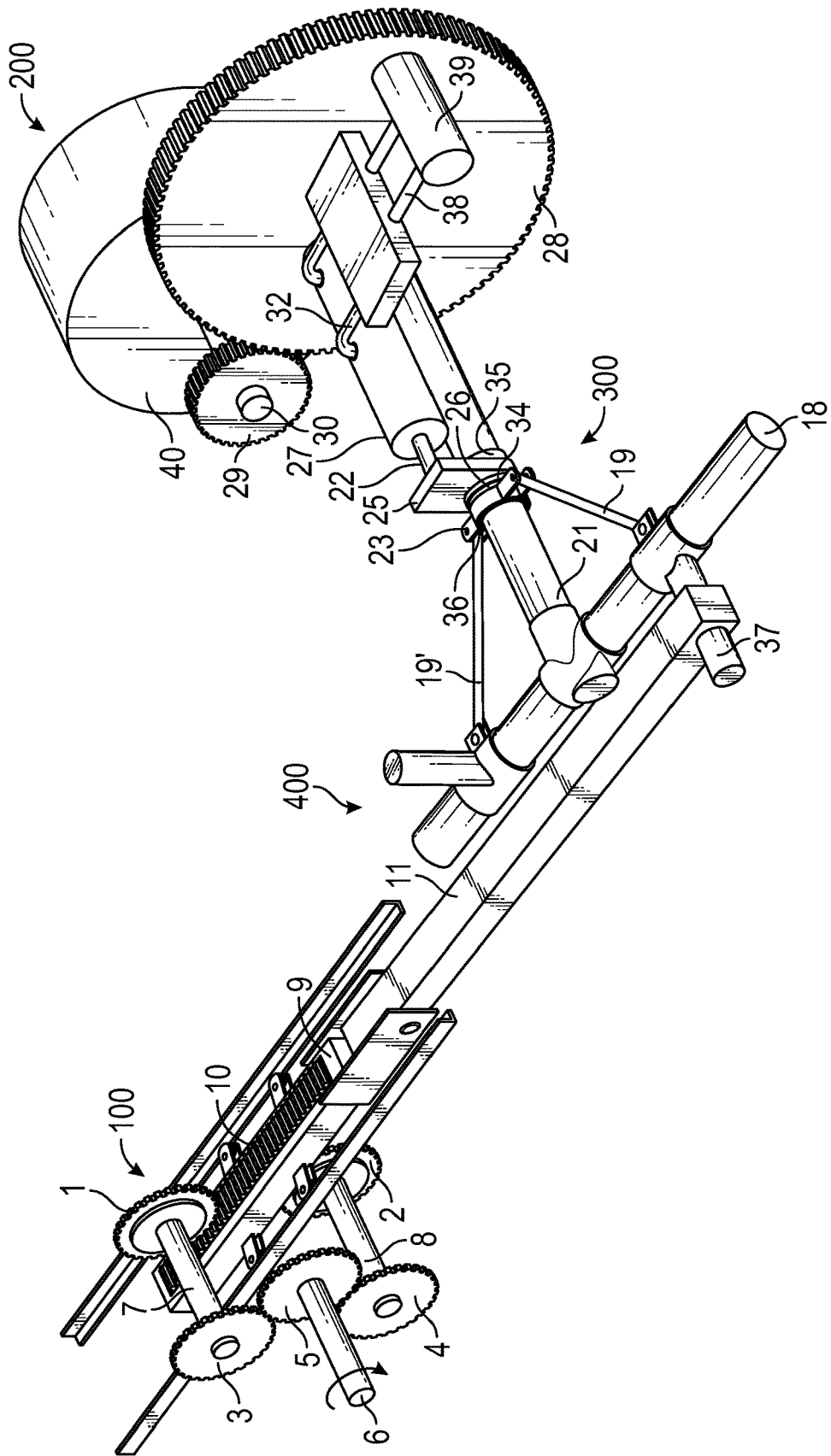
FIG. 9 is a schematic view of the shift system related to the improved continuously variable transmission in the present invention when the rotating arm is parallel to the connecting rod.
Figure 10:
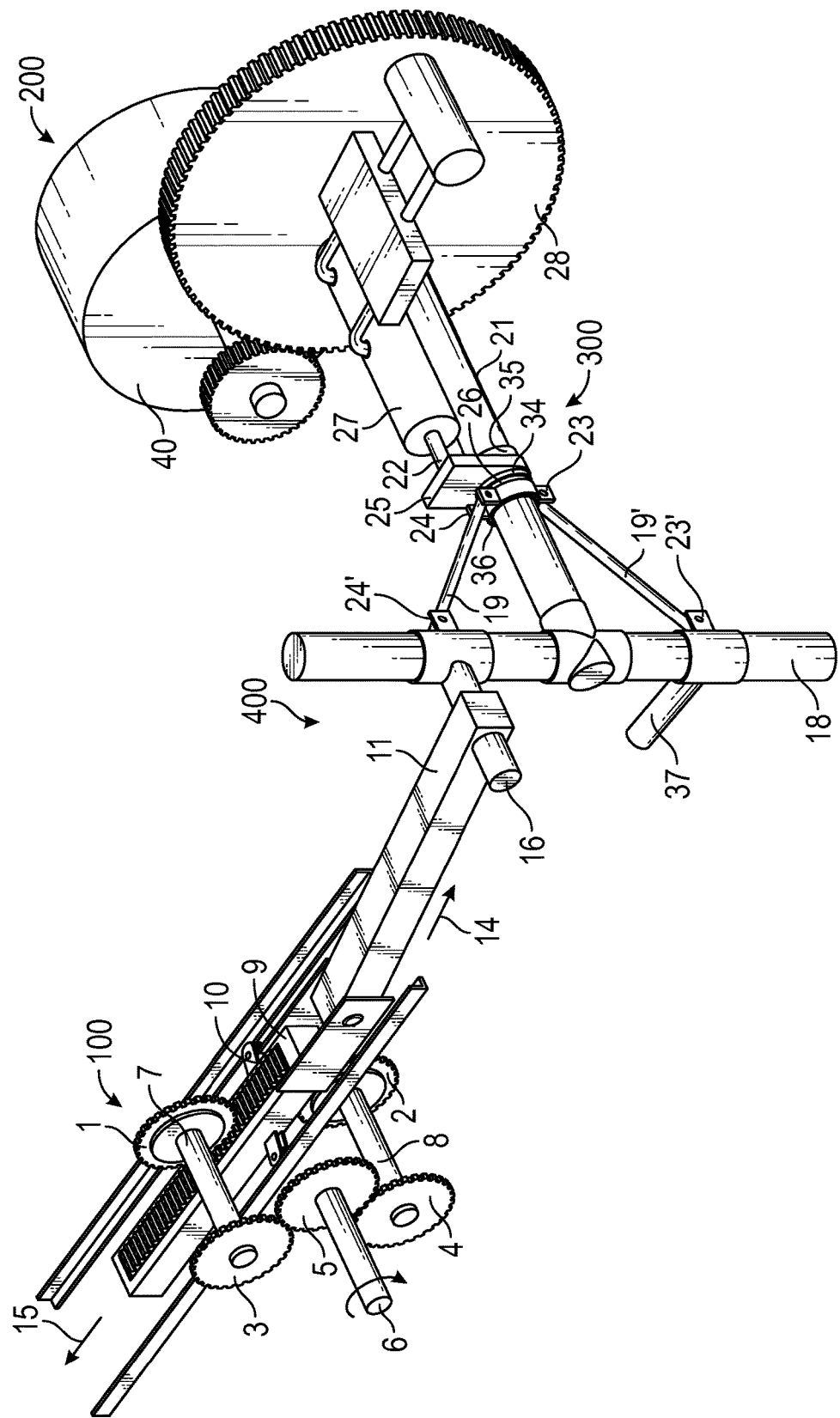
FIG. 10 is a schematic view of the shift system related to the improved continuously variable transmission in the present invention when the rotating arm is rotating to be parallel to the connecting rod.
Figure 11:
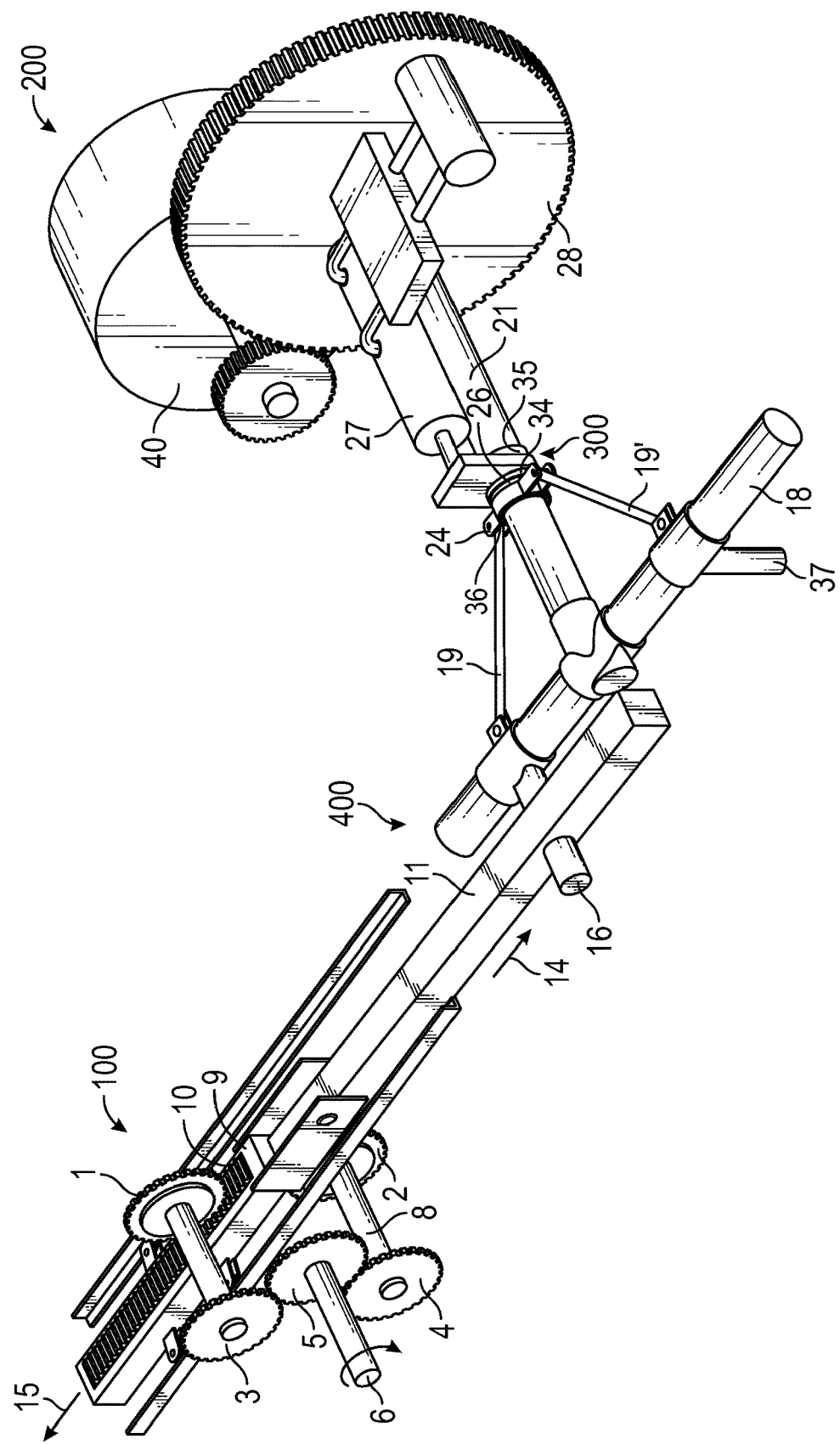
FIG. 11 is a schematic view of the shift system related to the improved continuously variable transmission in the present invention when the rotating arm is rotating 180 degrees from FIG. 9.
Figure 12:
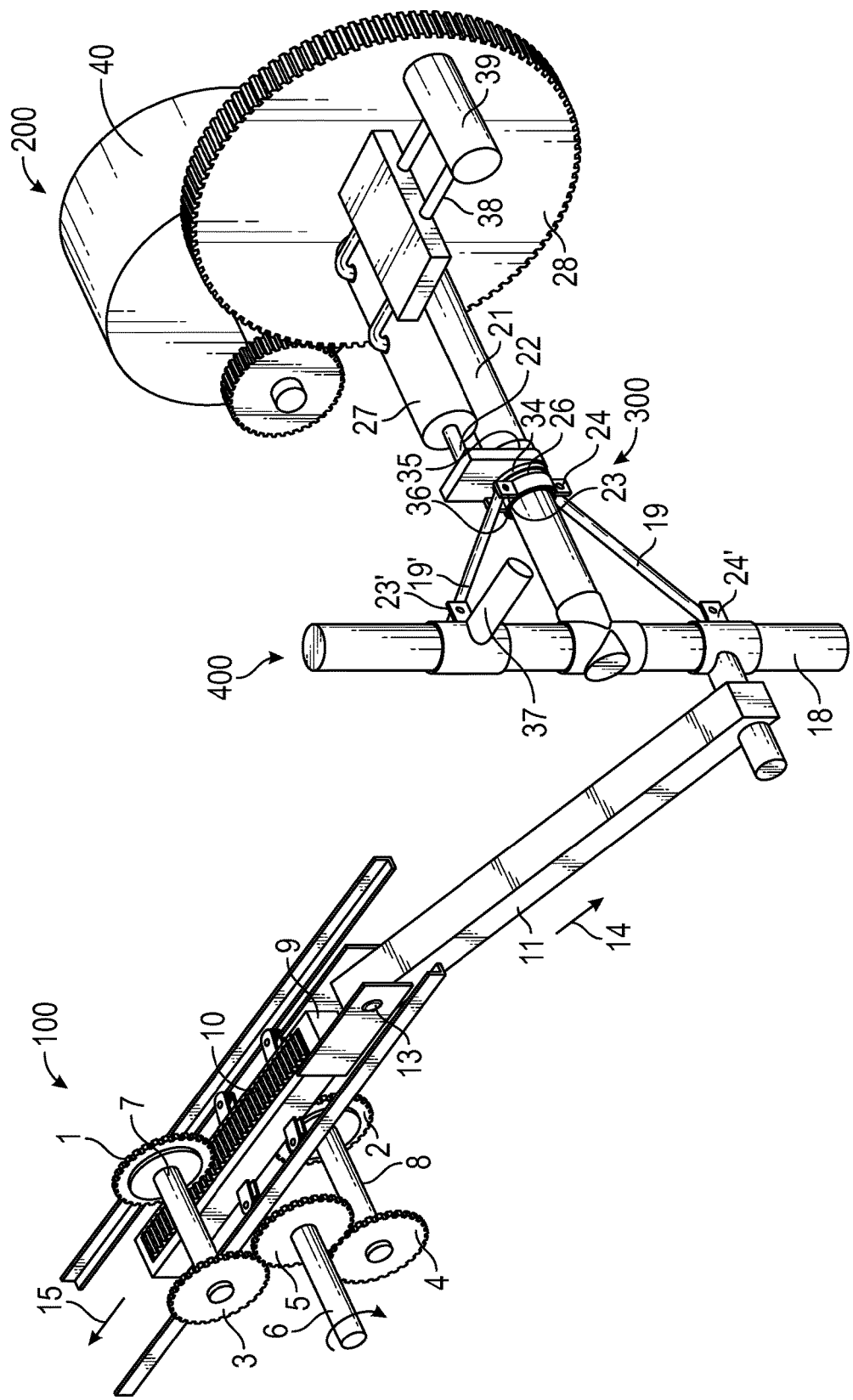
FIG. 12 is a schematic view of the shift system related to the improved continuously variable transmission in the present invention when the rotating arm is rotating 270 degrees from FIG. 9.

Referring to FIG. 8, a parameter R can be defined as $R_x/R_0$, wherein $R_x$ is variable indicating the distance between the middle portion of the rotating arm 18 and the position of the upper (or lower) flange, and $R_0$ is the radius of the freewheel 1 or 2. As discussed above, when the hydraulic cylinder 27 moves towards the rotating arm 18, the distance of the stretchers 19 and 19' on the rotating arm 18 increases, namely $R_x$ increases as shown in FIG. 8. Assuming $R_0$ is a constant, we can conclude that the higher the parameter R is, the higher speed and lower torque the transmission can provide. On the contrary, when the parameter R is lower, it indicates that the speed is lower but the torque is higher.

The connecting assembly 400 may include the rotating arm 18, the upper flange 24' on the sliding sleeve 20, the lower flange 23' on the sliding sleeve 20', a balancing pin 37 and a crankpin 16 extending from the opposite side of the upper flange 24'. The crankpin 16 is pivotally connected to the connecting rod 11, so the power generated from the power input assembly 200 can be transmitted to the power output assembly 100.

FIGS. 9 to 12 shows how the power is transmitted through the improved CVT from the power input assembly 200 to the power output assembly 100. The rotating arm 18 starts with a zero degree which is parallel to the connecting rod 11, and when the power starts to kick in from the power input assembly 200, the main rotating shaft 21 is driven to rotate the rotating arm 18 to 90 degrees which is perpendicular to the main rotating shaft 21, then 180 degrees and 270 degrees to complete the entire power transmission cycle. During the power transmission cycle, the connecting rod 11 is driven to move the move the main rod 9 to drive the freewheels 1 and 2, and further the output gear/shaft 5 and 6 as discussed above.

Comparing with conventional CVTs, the present invention is advantageous because the improved continuously variable transmission (CVT) in the present invention employs only gears and hydraulics for the transmission of power. More specifically, the speed and torque of can be managed by the stretchers 19 and 19' by their opening on the rotating arm 18 which is controlled by the hydraulic cylinder 27, which does not need to use additional energy to keep the transmission "tight enough" to engage and to prevent any "slipping," and the overall efficiency of power transmission would be increased.

Having described the invention by the description and illustrations above, it should be understood that these are exemplary of the invention and are not to be considered as limiting. Accordingly, the invention is not to be considered as limited by the foregoing description, but includes any equivalents.

What is claimed is:
1. A shift system related to a continuously variable transmission (CVT) comprising:
   a power input assembly, having a power source, a hydraulic power transmitting system, a main rotating shaft and a power input assembly;

a power output assembly, having a first freewheel connecting with a first gear through a first shaft, a second freewheel connecting with a second gear through a second shaft, a main rod, an output gear and an output shaft, wherein the first freewheel engages with a first main rod rack on top of the main rod, while the second freewheel engages with a second main rod rack at a bottom portion of the main rod;

a collar assembly having a sliding collar configured to slide on the main rotating shaft and pivotally connecting with the power input assembly;

a connecting assembly having a rotating arm, a plurality of sliding sleeves connecting with the power input assembly, and a crankpin extending from the rotating arm and pivotally connecting with a connecting rod that is pivotally connected with the main rod;

wherein the hydraulic power transmitting system in said power input assembly has at least one hydraulic cylinder with a hydraulic position rod extending therefrom, and one end of the hydraulic position rod is configured to be connected to an end plate to control the movement of the power input assembly, wherein the power input assembly has a first stretcher pivotally connected to an upper portion of the sliding collar on one end, and pivotally connected to an upper sliding sleeve on the rotating arm; and a second stretcher pivotally connected to a lower portion of the sliding collar on one end, and pivotally connected to a lower sliding sleeve on the rotating arm, wherein the rotating arm is configured to rotate in a circular manner to drive the connecting rod and the main rod to further drive the first and second gears and the output gear, and the speed and torque provided by the CVT is controlled by a distance between the first and second stretchers on the rotating arm.

2. The shift system related to a continuously variable transmission (CVT) of claim 1, wherein the first and second freewheels engage with the first and second main rod racks respectively of the main rod in a rack and pinion manner.

3. The shift system related to a continuously variable transmission (CVT) of claim 1, wherein the power input assembly further includes an input shaft extending from the power source and connecting with an input gear, said input gear engaging with a reduction gear.

4. The shift system related to a continuously variable transmission (CVT) of claim 3, wherein the main rotating shaft is driven by the reduction gear.

\* \* \* \* \*